A. H. INGLE.
POWER OPERATED TAILSTOCK FOR LATHES.
APPLICATION FILED MAR. 6, 1917.
1,326,597.
Patented Dec. 30, 1919.
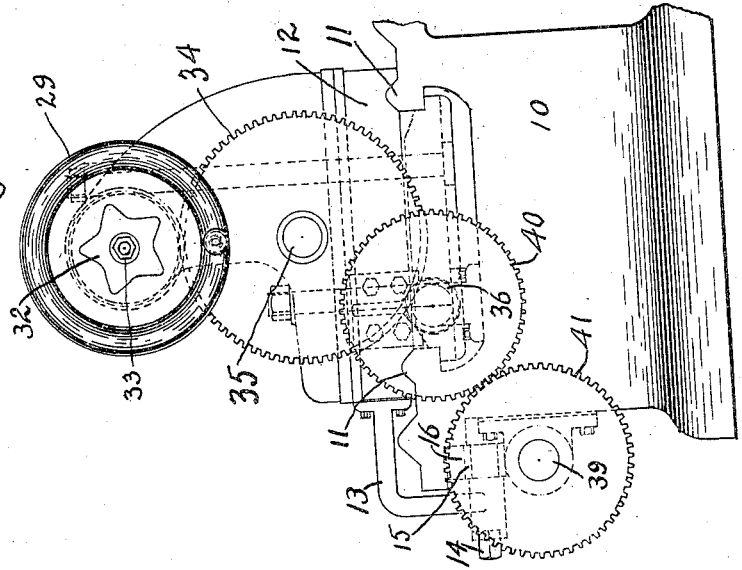
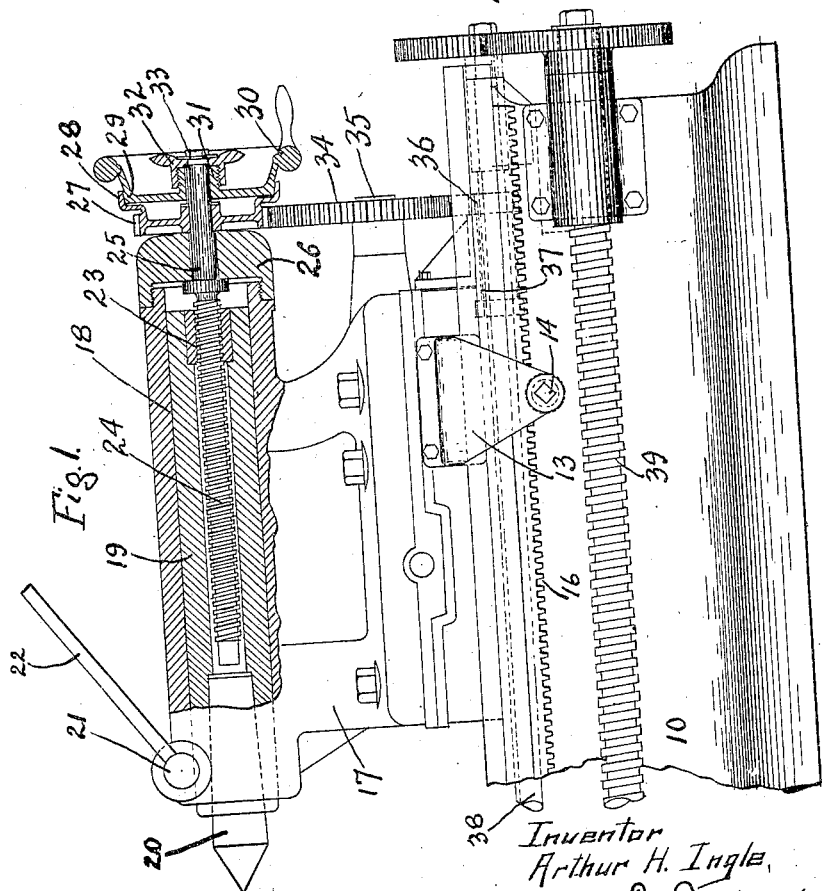
Inventor
Arthur H. Ingle,
by Clyde L. Rogers
his Atty.

UNITED STATES PATENT OFFICE.

ARTHUR H. INGLE, OF ROCHESTER, NEW YORK.

POWER-OPERATED TAILSTOCK FOR LATHES.

1,326,597.   Specification of Letters Patent.   Patented Dec. 30, 1919.

Application filed March 6, 1917. Serial No. 152,898.

*To all whom it may concern:*

Be it known that I, ARTHUR H. INGLE, a citizen of the United States, and resident of Rochester, county of Monroe, State or New York, have invented an Improvement in Power-Operated Tailstocks for Lathes, of which the following description, in connection with the accompanying drawings, is a specification, like characters on the drawings representing like parts in each of the several views.

This invention relates to lathes and particularly to the tail stock mechanism thereof. A prime object of the invention is to provide operating connections whereby a power feed may be imparted to the tail stock throughout the range of adjustments of the tail stock along the lathe bed. To this end I provide a slidable splined connection to the tail stock operating gearing from a power shaft extending between the ways of the bed under the tail stock. The invention will be better understood from the following detailed description taken in connection with the accompanying drawings and will be thereafter pointed out in the appended claims.

Referring to the drawings:

Figure 1 is a side elevation of the tail stock portion of a lathe equipped with my improved power feed connections, a portion of the tail stock proper being shown in section; and Fig. 2 is an end view thereof.

A portion of a lathe bed is indicated at 10 with usual slide ways 11 on which is mounted a tail stock carriage 12. This carriage has depending therefrom at the front side thereof a bracket piece 13 which has journaled therein a short shaft 14 having fixed at its inner end a pinion 15 engageable with the rack 16 of the lathe bed whereby upon applying a wrench to the squared end of the shaft 14 the tail stock carriage may be adjusted along the ways of the bed manually. The tail stock head 17 is mounted on the carriage 12 in usual or any suitable manner, and has at its top a usual horizontal bore or passage 18 to receive the sliding shell block 19 which is socketed at its forward end to receive the tail center 20. A usual turning cam lock 21 with an operating handle 22, journaled at the forward end in the top of the head 17 is provided for locking the tail stock in adjusted position at will. The shell block 19 is equipped at its rear end with a nut 23 engageable by a long screw 24 extending into the axial passage of the block 19, this screw having a plain rearward extension 25 swiveled and held from endwise movement in a cap 26 threaded to the rear of the top of the head 17. The extension 25 has fitted to turn thereon outside the cap 26 a spur gear 27 having formed therewith an internal cone clutch member 28. The clutch member 28 is engageable by an external cone clutch head 29 formed with a hand wheel 30 and also having a threaded axial nipple 31 slidably keyed on the end of the extension 25. The nipple 31 is engaged by an adjusting nut formed with a hand wheel 32 fitted on the extremity of the extension 25 between the end of the nipple 31 and a retaining screw 33 set into the end of said extension. The gear 27 is in driven engagement with a spur gear 34 journaled at 35 on the head 17 and in turn driven by a pinion 36 formed with a sleeve bearing extension 37 slidably keyed on the power shaft 38, which shaft extends lengthwise of the bed between the ways under the tail stock, and has a lengthwise spline therealong for driving the keyed pinion 36. The sleeve bearing extension 37 is fitted in bearings therefor of the tail stock head and thus serves to hold the gear 36 operatively alined. It will thus be understood that by the described connections, the screw 24 may be operated for adjusting the tail stock center by power transmitted from the shaft 38 to the pinion 36 and through gears 34 and 27 and that this driving connection will remain undisturbed whatever may be the adjusted position of the tail stock carriage along the ways of the bed the pinion 36 being held to move with the carriage 12. It will further be understood that to impart power to the tail stock in this way the clutch members 28, 29 are held engaged by adjusting the hand wheel 32 so that the nut integral therewith will press the clutch members together. When it is desired to disconnect the tail stock from the power feed the clutch members 28, 29 are of course released by operation of the hand nut 32, when the tail stock center may be adjusted by hand through operation of the hand wheel 30.

Connections are also shown for operating the lead screw 39 from the shaft 38. For this purpose a spur gear 40 is fixed at the end of the shaft 38 in driving engagement with a gear 41 fixed on the end of the lead screw. I do not desire to be limited to the precise structural embodiment of the invention herein exhibited and desire the present construction to be considered as illustrative and not restrictive, referring rather to the appended claims than to the foregoing description, to indicate the scope of the invention.

Having described my invention, what I claim as new and desire to secure by Letters Patent is:

1. The combination with a tail stock carriage mounted for adjustment along the ways of a lathe, a tail stock dead center mounted for endwise sliding adjustment in said carriage, and a power drive shaft extending lengthwise of the lathe bed, of driving connections from said shaft to said tail stock center arranged to move said center and remain operatively connected throughout the range of adjustment of the tail stock carriage along the ways of the lathe.

2. Apparatus of the kind described, comprising a tail stock carriage adjustably mounted on the ways of a lathe, a tail stock dead center mounted for sliding endwise adjustment in said carriage, a power shaft extending lengthwise of the lathe bed between said ways and beneath said carriage, and operating connections for said tail stock center arranged to remain operatively engaged with said shaft throughout the range of adjustment of said tail stock carriage.

3. Apparatus of the kind described, comprising a tail stock carriage adjustably mounted on the ways of a lathe bed, a power shaft extending lengthwise of the bed between said ways, a tail stock dead center slidably fitted for endwise adjustment in said carriage, an operating screw for said center, and geared connections from said shaft to said screw including a member slidably keyed to said shaft and having provision to be held for operative transmission throughout the range of adjustment of the tail stock carriage.

4. Apparatus of the kind described, comprising a tail stock carriage slidably fitted to the ways of a lathe bed, a power shaft extending lengthwise of said bed, a tail stock dead center mounted for endwise sliding adjustment in said carriage, an operating screw for said center, and geared connections from said shaft to said screw including a disconnecting clutch having associated therewith a manual operating device for the center.

5. Apparatus of the kind described, comprising a tail stock carriage adjustably mounted on the ways of a lathe bed, a power shaft extending lengthwise of the bed between said ways and splined along the length thereof, a tail stock dead center slidably fitted to said carriage for endwise adjustment, an operating screw for said center, and gear connections from said shaft to said screw including an element slidably fitted to said shaft and having a key engaging said spline, and including also a disconnecting clutch device equipped with means for operating the center manually when said clutch device is disconnected.

In testimony whereof, I have signed my name to this specification.

ARTHUR H. INGLE.